Figure 5:
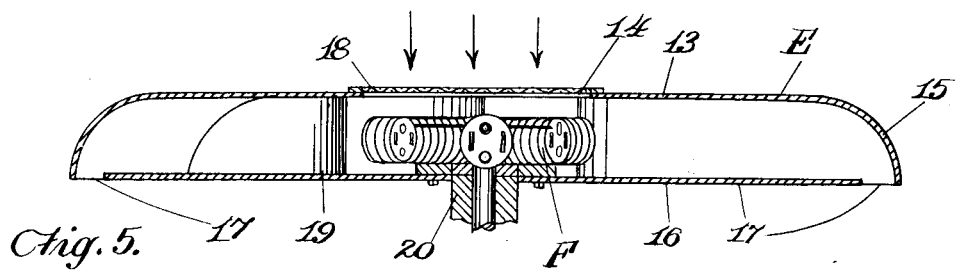

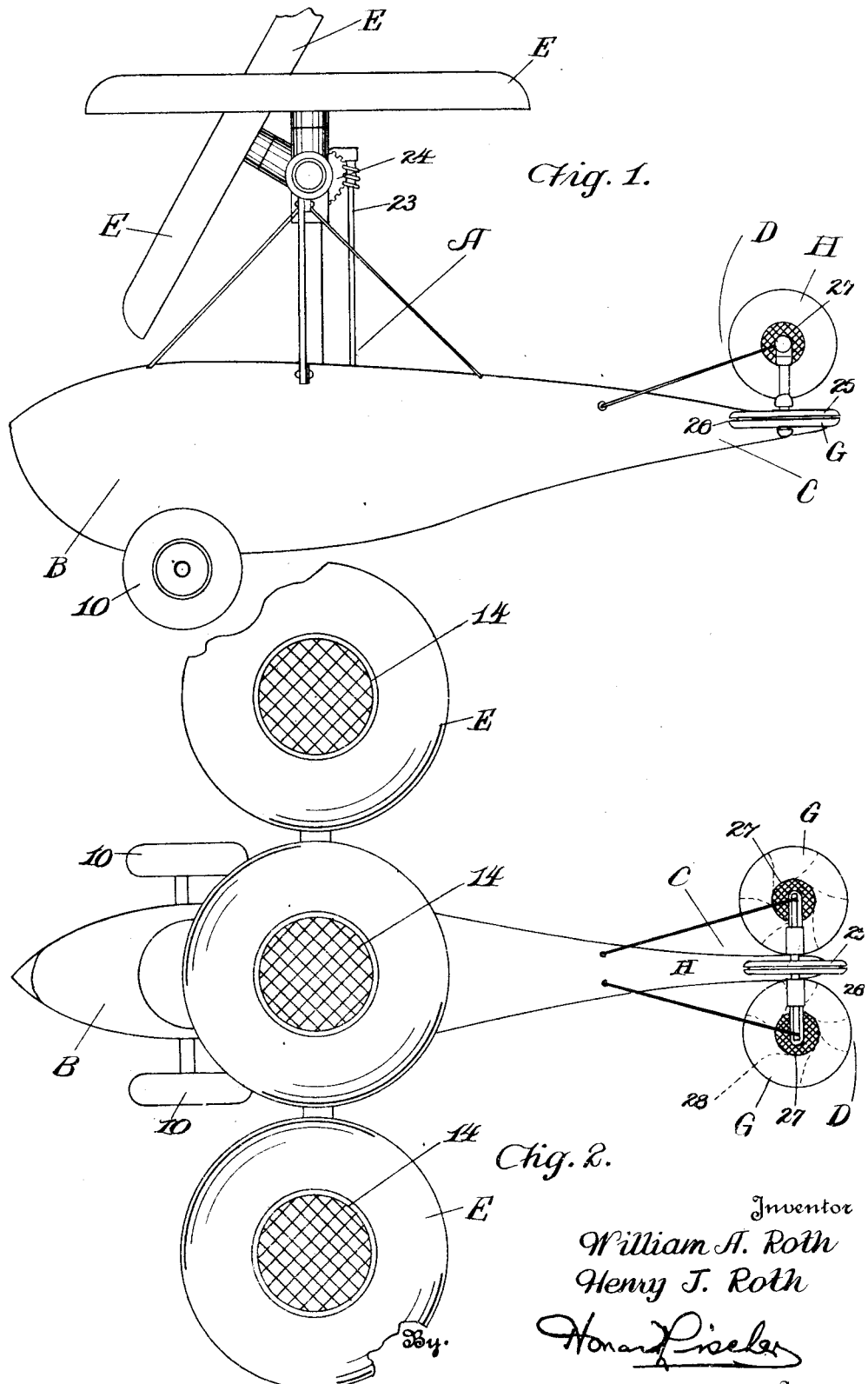

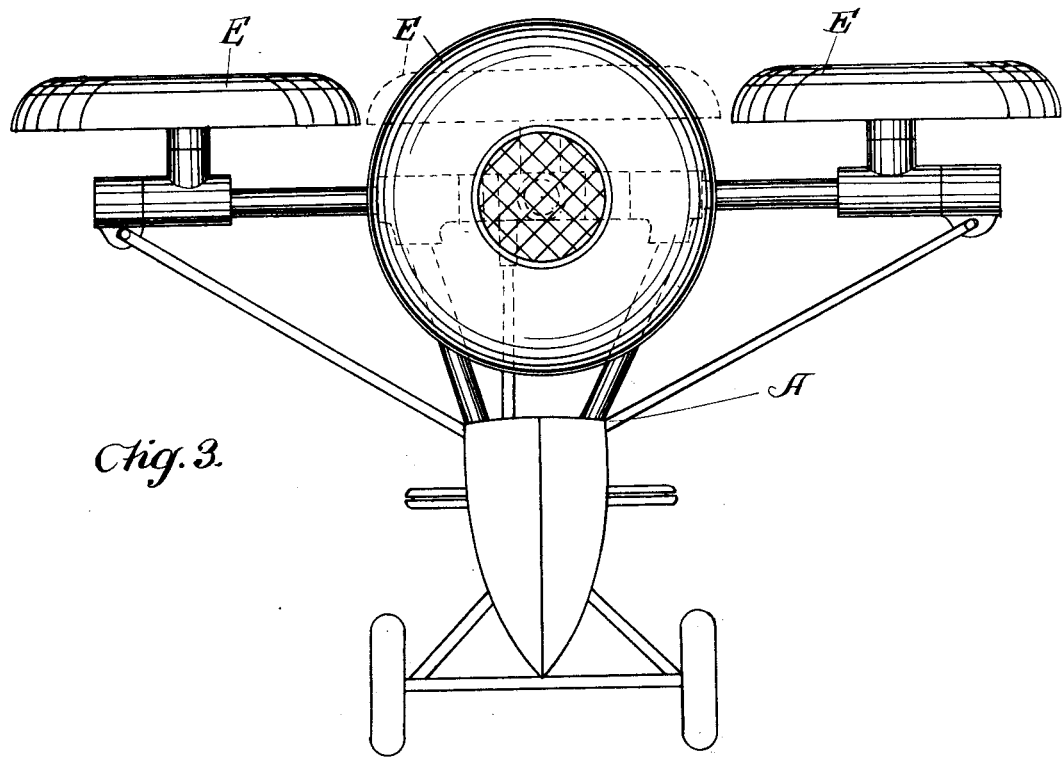
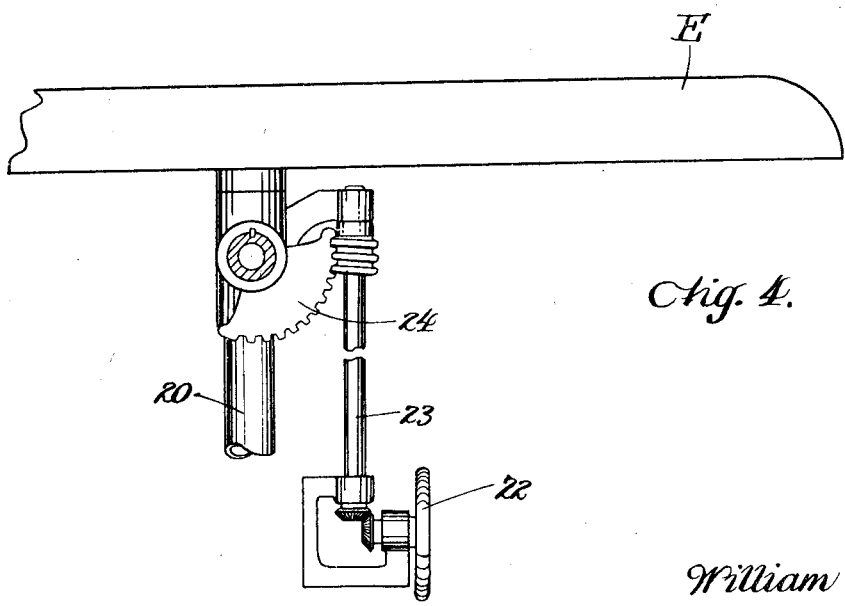

June 26, 1934.　　　W. A. ROTH ET AL　　　1,964,179
AIRPLANE
Filed March 19, 1928　　　3 Sheets-Sheet 3

Inventor
William A. Roth
Henry J. Roth

By

Attorney

Patented June 26, 1934

1,964,179

UNITED STATES PATENT OFFICE 1,964,179

AIRPLANE

William A. Roth, St. Paul, and Henry J. Roth, New London, Minn., assignors of one-third to Trew F. Poole, St. Paul, Minn.

Application March 19, 1928, Serial No. 262,721

5 Claims. (Cl. 244—19)

Our invention relates to an airplane having means adapted to provide a greater safety under varying weather conditions and the primary object of which is to provide a means of lifting the airplane virtually straight up from its landing point or permit it to settle down to a landing. We accomplish the lifting by a peculiar means of discs which rotate drawing the air above the same through the center of the discs and discharging the air below the discs out around the lower periphery of the same. These discs may be adjustable so as to balance the operation of our airplane and to provide a means of propelling the airplane.

It is a feature of our invention to provide an airplane having greater safety under all conditions of weather and flying speeds together with an airplane which can take off or land without forward speed. We believe that our airplane should permit the operator to land in a very small space owing to the fact that the plane can hover until it is in the desired position and then can drop gradually to the landing place.

It is also a feature of our invention to provide an airplane of a more stable nature owing to the peculiar operating means which includes a series of rotating disc planes. Our airplane is designed to permit these planes to be rotated at different speeds if it is desired, thus stabilizing the airplane.

Further, we provide rotating lifting disc planes which are placed in a position to rotate horizontally in lifting the airplane, and means for governing the operation of the lifting discs so that they will all rotate at a constant speed in ordinary flying or taking off, and independent control means to increase or decrease the speed of any one of the discs at will. The governing device is to govern the speed and position of the discs so that in operating the airplane, it can be properly stabilized by either operating all of the discs at a constant uniform speed or varying any of them to give the proper balance. We provide means for operating the central disc plane in a manner so as to move it to an angle in relation to the other disc planes so as to propel the machine forward in operation. All of the discs may be arranged so that they can be tilted from a horizontal plane to the desired position, however, we have designed to show the central disc tiltable forwardly to act as a propeller means. We believe that through the disc plane for lifting and propelling our airplane it will be possible to provide such a speedy airplane as to be very valuable in operation, particularly for use in times of war and such times as it is desired to provide a speedy aircraft.

It is also an object of our invention to provide an airplane operating means in the form of discs which rotate in such a manner as to provide a gyroscopic action to assist in stabilizing the same in different wind and air conditions to a very large degree.

These features together with other objects and details of our airplane will be more fully and clearly set forth in the specification and claims.

Figure 6:
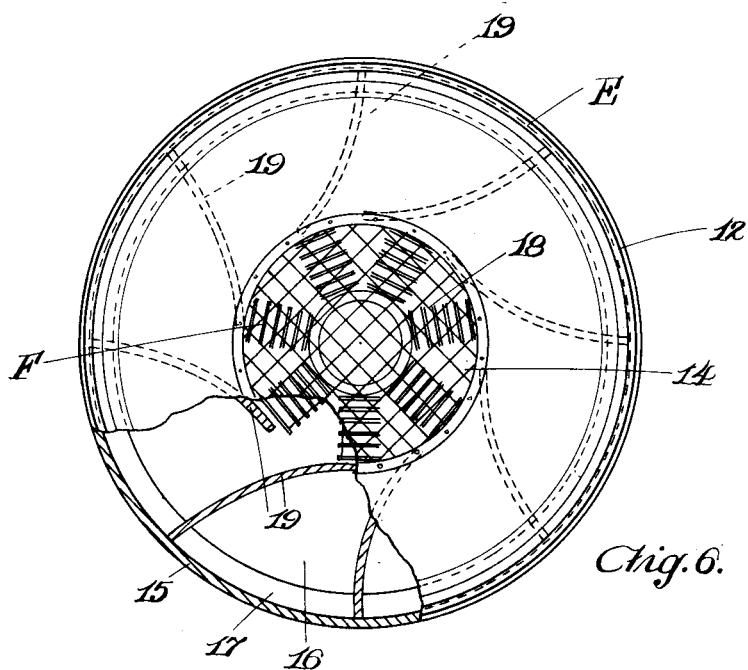
Figure 7:
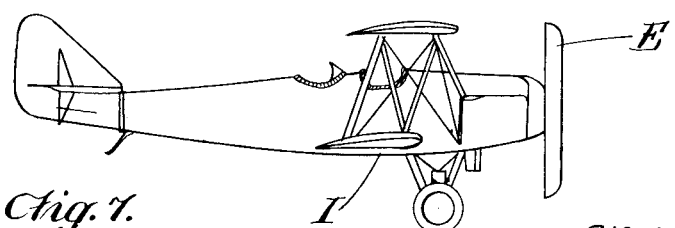

In the drawings forming part of this specification:

Figure 1 is a side view of our airplane.
Figure 2 is a plan view of the same.
Figure 3 is a front view of the same.
Figure 4 is a detail of a portion of the same.
Figure 5 is a detail of one of the disc planes partly in section.
Figure 6 is a plan view partly in section of one of the disc planes.
Figure 7 illustrates a side view of an ordinary airplane equipped with our disc plane as a propeller.

In the drawings all of the illustrations are more or less diagrammatic owing to the fact that it is primarily the object to cover the detail of the lifters and propellers which we term our rotatable disc planes. It is in the particular construction, formation and resultant of the same wherein we desire to set forth our primary features of our invention.

In the drawings, our airplane A is designed with a fuselage B adapted to form the body of the airplane A and designed to carry passengers and such other loads as are ordinarily carried by airplanes. The fuselage B is provided with landing wheels 10 under the fuselage to permit the transmitting of our airplane about into different positions. The empennage C of our airplane extends from the fuselage B in virtually the ordinary shape and is provided with the guiding means D which will be more fully hereinafter described.

Our airplane A is provided with rotatable disc planes E which are supported above the fuselage B in a suitable manner as illustrated in Figure 1. The illustration of the supporting means is only diagrammatic as is also true of the major parts such as the fuselage and empennage of the airplane A. The airfoil which comprises the disc planes E are of primary importance in our invention as they provide a means of lifting, propelling and stabilizing the airplane A in its operation.
110

The disc planes E are formed with a circular body portion 12 with a top plate 13 having a central opening 14 formed therein. The outer edges of the top plate curve downwardly at 15 to meet the plane of the bottom 16. The bottom plane 16 is virtually straight and is formed with a peripheral opening 17 out of which the air is exhausted which is drawn in through the opening 14 in the operation of our disc planes E. The opening 14 provides the air inlet into the disc plane E and is covered with wire mesh 18 to prevent any foreign matter entering into the disc in its operation. The upper and lower plates 13 and 16 of the disc plane E are spaced apart as illustrated in Figure 5, and we provide a series of arcuated blades or vanes 19 between the same. The blades 19 are adapted to curve from the central opening 14 toward the peripheral opening 17 and fill the space between the plates 13 and 16 so as to in a sense divide the inner space between the plates 13 and 16 into compartments through which the air is adapted to pass from the central opening and out through the peripheral opening 17. The vanes or blades 19 act as a support to assist in holding the members 13 and 16 together. These parts can be welded or secured together in any other suitable manner not illustrated.

The construction of the plane disc E is of a sturdy nature and is adapted to provide a means of creating a vacuum by drawing air through the opening 14 and passing it out through the peripheral opening 17. This vacuum is made above the plane disc E in the rotation of the same.

We have illustrated diagrammatically an engine or motor F positioned in the plane E which is secured to the supporting shaft 20 in any suitable manner so that when the motor F is in operation the disc plane E is adapted to be rotated at the desired speed. As the disc E is rotated by the motor F a vacuum is created above the disc and the air which passes through the opening 14 is adapted to pass out of the peripheral opening 17 causing a pressure below the plane E having a tendency to cause the plane to rise owing to the pressure of the air below and the vacuum above. This draft of air passing through the opening 14 is directed over the motor F making a cooling medium for the same which is particularly desirable where the motor F is an internal combustion engine and the blades 19 within the space between the top 13 and the bottom 16 of the plane 17 drive the air out through the opening 17 with considerable force, causing the disc plane E to create a propelling means which lifts the airplane A.

Any one or all of the disc planes E may be supported in a manner to be tilted by operating the wheel 22 which operates the shaft 23 in a manner to move the quadrant 24 so as to move the disc plane E into a tilted position, as illustrated in Figure 1 or Figure 3. We have illustrated the hand wheel 22 for operating the disc E as illustrated, however, it is obvious that any suitable means can be employed to move any of the discs out of their normal horizontal position. The wheel 22 is designed, as illustrated, to operate the central disc plane E which is tiltable in a manner to permit the same to act as a propeller. When the airplane has reached a desirable height in the air the central disc plane E may be moved into the desired position to operate as a propeller which will direct the airplane forwardly while the side disc planes E operate in a manner to keep the airplane at the desired altitude.

We have illustrated the motor F as located in the plane E. This is only for a convenience of showing a means of operating the disc planes E. The illustration is diagrammatic and it is understood that one portion of the motor F is secured to the plane, while the other is so connected to the shaft 20 as to cause the plane E to rotate by the operation of the motor. An electrical motor propelling means may be employed or any other suitable motive means. It is also evident that the planes E may be operated by any other suitable propelling means so as to rotate them at the desired speeds. The outer disc planes E on either side of the central plane normally remain horizontal, however, it is evident that they may be tilted by suitable mechanism such as the hand wheel 22 and the operating shaft 23 or any other suitable means, if it is desired.

The empennage is provided with the operating means D which includes a series of disc plane rotors G which extend horizontal similar to the guiding means now carried by an airplane. We also provide an upright rotor plane H which is similar to the rotors G and which is positioned centrally between the same and so positioned in a vertical plane as to correspond to the rudder position of the ordinary airplane. Each of the rotors G and H is of the same relative nature as the rotor planes E, excepting that the sides 25 of the rotors G and H curve toward each other and a peripheral opening 26 for the output of air is provided. Each of these rotors is provided with an intake air opening 27 centrally of the rotors so that in operation the rotors G and H draw air in through the opening 27 and discharge the same out through the annular or peripheral opening 26.

In this manner the rotors G and H operate virtually the same as the rotor discs or planes E, drawing the air in through the center and discharging it out around the peripheral edge. The rotor H has openings 27 on each side of the side plates 25 with the center discharge peripheral opening 26, while the rotors G have the openings 27 for the intake of air only on the top. Thus the rotors G act in the same manner as the rotor disc planes E. The rotation and operation of the disc planes G which are normally positioned horizontally tend to lift the empennage or tail end of our airplane A at the time that the disc planes E are lifting the same to the desired altitude. The rotors G and H are provided with vanes or blades 28 of the same nature as the vanes or blades 19.

In operation our airplane A is designed to lift itself virtually straight up off of the ground in the operation of the rotor planes E, drawing the air in through the opening 14 and discharging it out through the peripheral opening 17. We have found our rotors to be very effective in operation and adapted to lift a considerable load. The rotor planes G simultaneously lift the empennage of the airplane and both the rotors G and H are provided with motive means such as F for driving the same which may be any form of motive power adapted to rotate the disc planes G and H at the desired speed of rotation. When our airplane A reaches the desired altitude it may then be propelled forward by tilting the propeller rotor plane E centrally positioned, as illustrated, by operating the tilting mechanism controlled by the handle 22. The airplane A will then be driven forward and the rotor planes E will act as stabilizers to permit the airplane A to glide through the air and in the direction desired by the operation of the rotors G and H. By regulating the speed of the rotors G and H the direction of travel of our airplane A may be easily obtained.

Should the motive power for any of the rotors and planes be shut off then the airplane A may be guided to a landing in the ordinary manner for the rotors G and H are adjustable, the detail of which is not illustrated, in the ordinary manner to guide the airplane to a landing. The rotor planes E form a very effective means of propelling the airplane A and should it be desired the ordinary airplane such as I, illustrated in Figure 7, may be equipped with a rotor plane propeller E providing the propelling means for the same of a nature to be desired owing to the fact that the smooth outer casing is not as dangerous as the open propeller. The guarded opening 14 by the mesh 18 prevents anything from injuring the propelling blades and the rotation of the propeller E in this form is not of the dangerous nature as the ordinary propeller which is not provided with any guard means and should anyone come within range of the same he would be very apt to be seriously injured. We believe that our rotor plane E provides a more efficient means of propelling the airplane either of the type A or I, and includes the means of drawing the air in centrally and directing the pushing draft out through the peripheral edge of the rotor in such a manner as to increase the efficiency to a very marked degree. The advantages of our airplane A are of a nature of the helicopter and yet are provided with inclosed rotor planes which may act as gliding planes to a large degree. The size of the rotor planes E may be in proportion to the load desired to be lifted and the adjustment may be varied so as to accomplish the desired results. We believe our rotors overcome many of the disadvantages of the ordinary helicopter construction and provide a means of lifting the airplane A in such a manner as to accomplish a very desirable result. We believe our airplane A may be more easily stabilized in unfavorable weather conditions, can be particularly adapted to sea-planes having the necessary pontoons in place of the landing gear, and permitting the plane to more readily float owing to the lifting action of the rotor propelling planes and having such a nature as to give increased speed by overcoming a large degree of air friction with which the ordinary plane must contend, depending upon the air pressure against the airfoil to maintain the altitude desired. So-called air pockets should not effect our airplane and the structure is such as to permit a landing in a more or less of a floating nature rather than having to depend on a certain forward speed for landing.

In accordance with the patent statutes we have described the principles of operation of our airplane and while we have illustrated only diagrammatically the general formation and construction of the same, and while we have illustrated a particular formation of rotor planes and propelling means, we desire to have it understood that the illustrations are only suggestive of a means of carrying out our invention and that other uses and adaptations together with changes within the scope of the following claims may be made without departing from the spirit of the invention.

We claim:

1. An airplane including, a series of rotor planes having a casing thereon forming a part thereof, internal combustion engine motive power within the rotor plane for rotating each plane independent of the other, and means for tilting any and all of said rotor planes to propel and stabilize said airplane.

2. An airplane including, a series of rotatable plane members, means disposed within each of said plane members to provide motive power for rotating the respective plane member, means for tilting one of said plane members to provide a propelling means for said airplane, and horizontal and vertical rotary plane members adapted to provide the lifting and propelling means, and horizontal and vertical rotor planes providing controlling and guiding means for the empennage of said airplane.

3. A propeller and plane for airplanes comprising, a rotatable plane member, a central air intake opening in one side of said plane member, arcuated blades in said plane member, and a peripheral outer opening in the other side of said plane member, a motor secured to said other side, whereby said plane propeller may be rotated to lift and propel an airplane and glide by air pressure against the side having the peripheral opening.

4. An airplane including, a fuselage, an airfoil comprising a series of rotatable disc planes, an empennage having rotatable disc members including a vertical disc member taking the place of a rudder, said disc planes and rotatable empennage members having central air intake means, and peripheral exhaust means to provide a vacuum and propelling means to stabilize said airplane in operation by varying the speed and position of said rotatable disc planes and rotatable empennage members.

5. An airplane including, a pair of horizontal rotatable disc planes in approximately the same horizontal plane, a central rotatable disc plane movable into approximately the same plane, means for adjusting one or all of said disc planes into horizontal and varying positions to propel said plane, each of said disc planes formed with a central air intake opening, and an outer peripheral air exhaust.

WILLIAM A. ROTH.
HENRY J. ROTH.